US008743656B2

(12) United States Patent
Herrmann et al.

(10) Patent No.: US 8,743,656 B2
(45) Date of Patent: Jun. 3, 2014

(54) METHOD OF SEISMIC DATA PROCESSING

(75) Inventors: Philippe Herrmann, Villepreux (FR); Gilles Lambare, Saint Fargeau Ponthierry (FR); Patrice Guillaume, Orsay (FR); Eric Suaudeau, Antony (FR)

(73) Assignee: CGG Veritas Services SA, Massy (FR)

( * ) Notice: Subject to any disclaimer, the term of this patent is extended or adjusted under 35 U.S.C. 154(b) by 837 days.

(21) Appl. No.: 12/156,401

(22) Filed: May 30, 2008

(65) Prior Publication Data
US 2009/0052280 A1 Feb. 26, 2009

(30) Foreign Application Priority Data

May 31, 2007 (FR) ........................................ 0755377

(51) Int. Cl.
*G01V 1/00* (2006.01)
*G01V 1/30* (2006.01)
(52) U.S. Cl.
CPC . *G01V 1/00* (2013.01); *G01V 1/301* (2013.01); *G01V 1/307* (2013.01)
USPC .............................................. 367/50; 367/38
(58) Field of Classification Search
USPC ................................................ 367/38, 50–53
See application file for complete search history.

(56) References Cited

U.S. PATENT DOCUMENTS

| 5,808,964 | A | * | 9/1998 | Lailly et al. | 367/53 |
| 6,002,642 | A | * | 12/1999 | Krebs | 367/73 |
| 7,345,951 | B2 | * | 3/2008 | Broto et al. | 367/53 |
| 7,493,241 | B2 | * | 2/2009 | Lee | 703/2 |
| 2006/0062083 | A1 | * | 3/2006 | Lee et al. | 367/50 |
| 2007/0214663 | A1 | * | 9/2007 | Pica | 33/1 HH |
| 2007/0271041 | A1 | * | 11/2007 | Peng | 702/14 |
| 2009/0116336 | A1 | * | 5/2009 | Summerfield et al. | 367/38 |

FOREIGN PATENT DOCUMENTS

| EP | 1239304 | 9/2002 |
| FR | 2301889 | 12/1996 |
| GB | 2280508 | 2/1995 |

OTHER PUBLICATIONS

Lambare et al., From Time to Depth Imaging: An Accurate Workflow, SEG, San Antonio 2007 Annual Meeting, pp. 3014-3018.

* cited by examiner

*Primary Examiner* — Krystine Breier
(74) *Attorney, Agent, or Firm* — Patent Portfolio Builders PLLC

(57) ABSTRACT

The invention relates to a method of seismic data processing, wherein the data includes a set of seismic traces, with each trace including a signal that has been recorded by a sensor after having been propagated in a subsurface area, with the signal being defined by an amplitude as a function of time, including the steps of:

migration of data according to an initial time-velocity model, picking in the time-migrated data one or more event(s) corresponding to one or more subsurface reflector(s) so as to obtain facets locally approximating the event, kinematic demigration of the facets plotted so as to obtain simplified seismic data in the form of a set of facets and a set of attributes associated with the facets.

9 Claims, 9 Drawing Sheets

METHOD OF SEISMIC DATA PROCESSING

PRIORITY INFORMATION

This application claims priority from French Application No. 0755377, filed May 31, 2007, the disclosure of which is incorporated here by reference.

CROSS-REFERENCE TO RELATED APPLICATION

This application claims priority to French Application No. 0755377 filed May 31, 2007 entitled "Method of Seismic Data Processing".

FIELD OF THE INVENTION

This invention relates to the field of seismic imaging. It relates more specifically to a method of seismic data processing.

PRIOR ART

In order to produce images of the subsurface, geologists or geophysicists conventionally use acoustic transmitters placed, for example, at the surface. As shown in FIG. 1, the transmitters S (also called sources) transmit waves that are propagated in the subsurface and reflected on the surfaces of the layers thereof (reflectors). The acoustic waves reflected toward the surface are recorded as a function of time by receivers R. The signals recorded by the receivers are called seismic traces.

Various digital processing techniques are conventionally applied to these traces so as to improve the signal-to-noise ratio and facilitate their interpretation. These techniques include the migration operation, which consists of determining, for a plurality of surface positions P of coordinates (x, y), a collection of migrated traces bearing information on events that describe the subsurface in line with the surface position P (x, y). The migration can be applied before or after the stacking of the traces, and we refer to time migration or depth migration depending on whether the output traces are represented according to the time or the depth. In both cases, the repositioning of events is based on a model of the wave propagation velocity in the subsurface, i.e. a time-velocity model for the time migration (Siliqi & Bousquie, 2001) or a depth-velocity model for the depth migration (Fagin, 1999). The time- or depth-velocity model makes it possible to calculate the travel time between the source and receiver positions and the image point. The estimation of the time- or depth-velocity model is an important and difficult step in the seismic processing chain.

There are numerous ways of arranging the collections of traces migrated before stacking of the data. It is thus possible to group all of the traces in line with a surface position P (x, y) and constitute gathers of traces at a common image point called a CIP (Common Image Point) gather. Generally, these CIP gathers are organised according to the source-receiver distance (also called the offset distance) as shown in FIG. 2, but it is also possible to organise them according to the angles of reflection (Xu et al., 2001), the orientation of the source-receiver segment, slopes at the surface (Xu and Lambaré, 1998; Duquet et al., 2001, Jiao et al., 20020, the position of the sources and receivers, etc. The analysis of the migrated images obtained for these different classes is the basis for numerous seismic trace processing techniques. Thus, CIP gathers are very widely used for the interpretation of subterranean geological structures:

1) the stacking of the traces of the CIP gathers at a constant surface position gives a precise image of the structure of the subsurface, 2) the form of the events observed on the CIP gathers makes it possible to assess the quality of the velocity model used in the migration (Yilmaz, 1987), 3) the amplitude of the events observed on the CIP gathers provides information on the mechanical characteristics of the formations encountered (AVO "Amplitude Versus Offset" studies).

Various techniques have thus been proposed for analysing these CIP gathers. However, while precise analyses have been carried out in the case of the depth migration, they have not yet been reported in the case of time migration, of which the analysis is often affected by the assumptions of constant time velocity and/or of the absence of dip (Dix, 1955; Brown, 1969; Schultz, 1982).

SUMMARY OF THE INVENTION

An objective of the invention is to improve the quality of the processing of acquired seismic data while simplifying the processing operations.

There is provided according to the invention a method of seismic data processing, wherein the data includes a set of seismic traces, with each trace including a signal recorded by a sensor after having propagated in an area of the subsurface, with the signal being defined by an amplitude as a function of time, including the steps of:

migration of data according to an initial time-velocity model, picking in the time-migrated data one or more event(s) corresponding to one or more reflector(s) of the subsurface so as to obtain facets locally approximating the event, kinematic demigration of the facets plotted so as to obtain simplified seismic data in the form of a set of facets and a set of attributes associated with the facets.

The term "facet" refers to a close local representation of an event on a neighbouring area of traces, migrated or not, which representation is defined by attributes locally characterising the event. The attributes describe a central position of the event and local slopes of the event in the gather of traces.

In one embodiment of the invention, the kinematic demigration step is performed on the basis of the same initial time-velocity model as the time migration step.

This makes it possible to obtain facets characterised by attributes qualified as "kinematic invariants", which are not dependent on the initial velocity model. The invariant attributes include, for example, for each facet after demigration, a time of a reflected event, source and receiver positions, and local slopes of the event reflected in the gather of traces. Thus, the demigrated facets clearly correspond to the local events that can be observed on the gathers of non-migrated traces, and are not dependent upon the velocity model used for the time-migration and time-demigration steps.

The demigration of facets is called "kinematic demigration" because it is applied only to the kinematic characteristics of the field reflected and not to the associated wavelets.

The invention makes it possible to take advantage of pre-stack time-migrated data from a previous processing operation.

On the one hand, due to the fact that the processing method is applied to this pre-stack time-migrated data, it does not require a step of building an initial depth model or a step of pre-stack depth migration (pre-SDM) (unlike the approach described in document EP1239304).

On the other hand, the step of picking data is facilitated by the quality of the pre-stack time-migrated data, without compromising the quality of the kinematic information recovered from the facets.

The kinematic invariants obtained by this process can then be used in a seismic data tomographic inversion process. An iterative process is, for example, described in the aforementioned document EP1239304, which does not require, at each non-linear iteration, picking and pre-stack migration of the initial seismic data.

In an embodiment of the invention, the method includes an iteration of the steps of:
  time or depth-migration of the facets and invariant attributes according to a time- or depth-velocity model,
  characterisation of an alignment of the migrated facets,
  updating of the time- or depth-velocity model so as to optimise the alignment of the migrated facets.

An optimisation of the depth-velocity model is, for example, described in the aforementioned document EP1239304.

In an embodiment of the invention, it is proposed to use a new criterion for estimating the alignment of the facets.

In particular, the updating of the velocity model can include an updating of the velocity field according to a criterion of minimisation regarding at least one of the local slopes of the migrated facets in the CIP gathers.

In an embodiment of the invention, the attributes associated with the facets include, in addition to the attributes representative of kinematic invariants (times, source and receiver positions, slopes in the non-migrated domain), a specular reflection angle, phase angles, an instantaneous velocity, a vertical stretch factor, a depth dip or CRS (Common Reflection Surface) attributes (Müller, 1999; Jäger et al., 2001).

In an embodiment of the invention, the plotting step is applied on the pre-summation time-migrated seismic data.

BRIEF DESCRIPTION OF THE DRAWINGS

Other features and advantages will become clearer from the following description, which must be read in view of the appended drawings, in which.

DETAILED DESCRIPTION OF PREFERRED EMBODIMENTS

Figure 1:
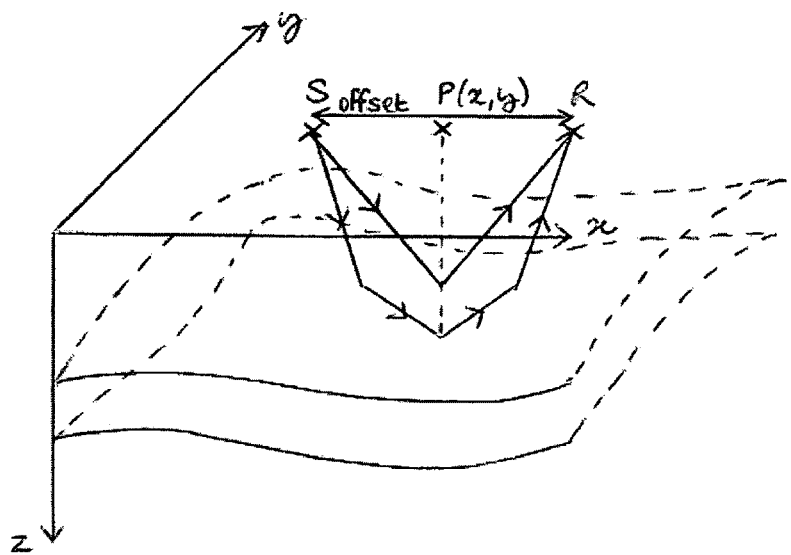
FIG. 1 diagrammatically shows an acoustic source and receiver, as they are used in seismic imaging, FIG. 2 diagrammatically shows a gather of seismic traces at a common mid-point.
Figure 2:
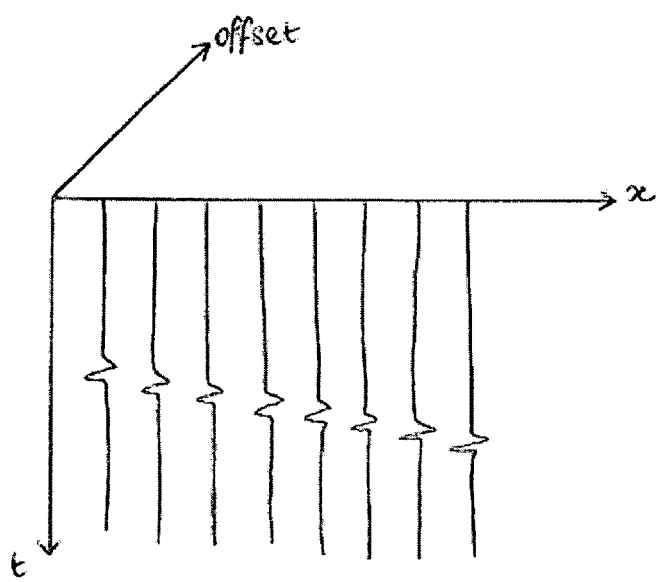
Figure 3:
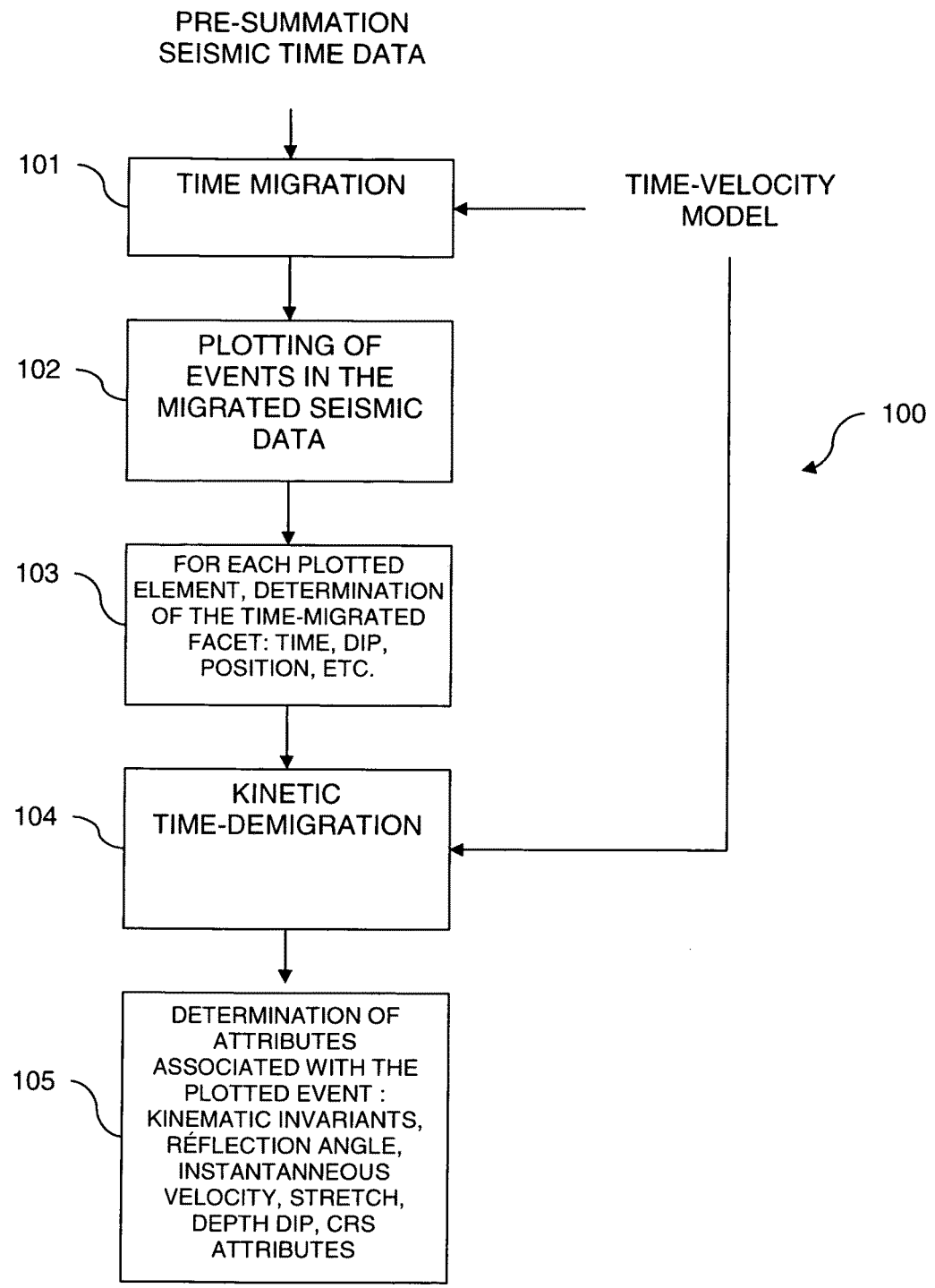
FIG. 3 is a diagram showing steps of a first seismic data processing phase consistent with an embodiment of the invention.
Figure 4:
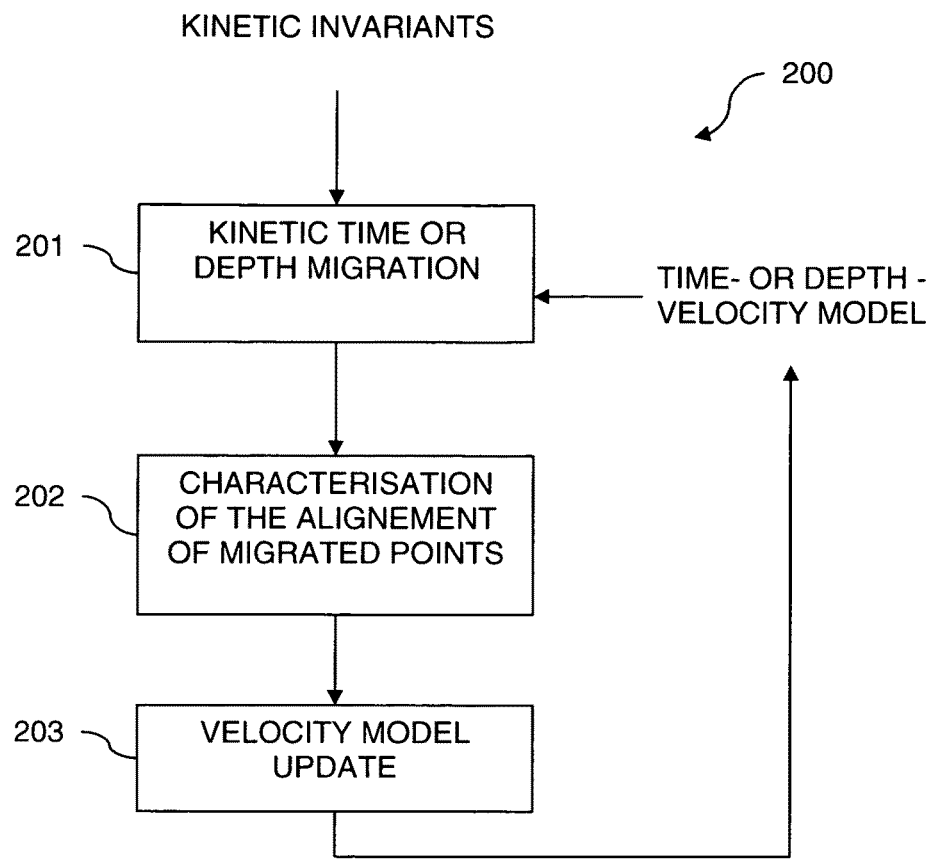
FIG. 4 is a diagram showing steps of a second seismic data processing phase consistent with an embodiment of the invention.

The seismic data processing process shown in FIGS. 3 and 4 includes two main processing phases: a first phase 100 of constituting kinematic invariants (FIG. 3) and a second phase 200 of tomographic inversion of these kinematic invariants, i.e. an estimation of the time- or depth-velocity model (FIG. 4), on the basis of the kinematic invariants.

Determination of the Kinematic Invariants

The first phase of the processing process shown in FIG. 3 is applied to time traces before migration. These traces correspond to the recording, as a function of time, by a sensor, of the amplitude of the signal propagated underground.

According to a first step 101, a migration of these seismic traces is performed according to an initial time-velocity model (PreSTM).

According to a second step 102, on each gather of traces obtained in the previous step, one or more events reflected in line with the surface point considered are picked.

Figure 5:
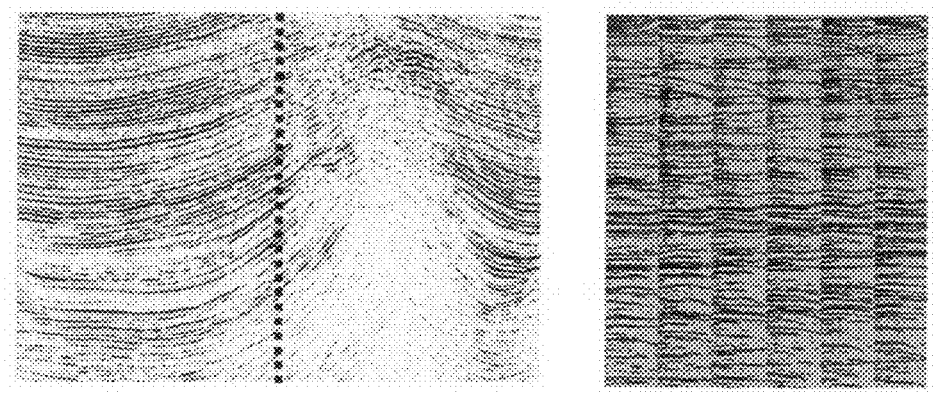
FIG. 5 shows a pre-stack time-migrated seismic data, with at the left-hand side, the stack of the CIP gathers, and, at the right-hand side, some CIP gathers.

FIG. 5 diagrammatically shows a cross-section of the pre-stack time-migrated seismic data (PreSTM) stacked on the CIP gathers (at the left) and common image point (CIP) gathers (at the right) from this data. The position of the CIP gathers is indicated in the cross-section by a dotted line. RMO curves, which characterise the alignment of the data picked in the CIP gathers have been superimposed with the picked data.

According to a third step 103, for each picked event, time and the associated time-migrated facet are determined. This facet is characterised by a dip (in directions x, y) and possibly a slope in the direction of the CIP gathers.

According to a fourth step 104, the kinematic demigration of the migrated facet is performed. This facet is characterised by source and receiver positions, by a central time and by slopes, taking into consideration the acquisition geometry and the rules of focusing on the times and the time migration gradients described in Chauris et al. (2001a, b and c), and Guillaume et al. (2001 and 2004) (see FIGS. 8 and 9 for the rules of focusing of the kinematic time migration).

The calculation of the acoustic source-receiver pair is a well-known step that can be performed according to a plurality of established techniques (Press et al., 1986).

On the basis of the acoustic source-receiver pair, various attributes associated with the plotted event are also determined, such as the angles of reflection, the angles of phase, the instantaneous velocity, the stretch factor, the depth dip, and optionally the CRS attributes. For all of these operations, the basic data are the components of the gradient of the time migration time.

The demigrated attributes together make it possible to characterise local events that can be observed in the seismic traces before migration. As their characteristic does not depend upon the velocity model used for the migration, these data are referred to as kinematic invariants (Guillaume et al., 2001, 2004).

These attributes associated with the pre-stack time-migrated image of seismic data make it possible to:

1) provide a depth tomography as described in the patent cited above;
2) provide a new type of time tomography making it possible to determine a time-velocity model with a single update;
3) calculate an instantaneous velocity (isotropic or anisotropic), a stretch factor, a depth dip and aperture angles associated with the pre-stack time-migrated trace gathers. This information can be used, for example, in stratigraphic inversions making it possible to characterise the nature of the subsurface (and in particular hydrocarbon reservoirs), or in various trace processing operations such as wavelet stretch compensation, CIP angle constitution, and amplitude-versus-angle studies;
4) estimate the curves of the local events in the pre-stack seismic data making it possible to reconstruct the CRS attributes (Müller, 1999; Jäger et al., 2001), capable of being used in various seismic processing processes (Duveneck, 2004).

Calculation of Attributes

With the determination of the acoustic source-receiver pair, it is possible to determine valuable information for the interpretation of time-migrated images. The components of the time migration gradients (FIG. 8) thus make it possible to calculate a stretch factor, a specular reflection angle, phase angles, an instantaneous velocity, a depth dip and CRS attributes.

Figure 10:
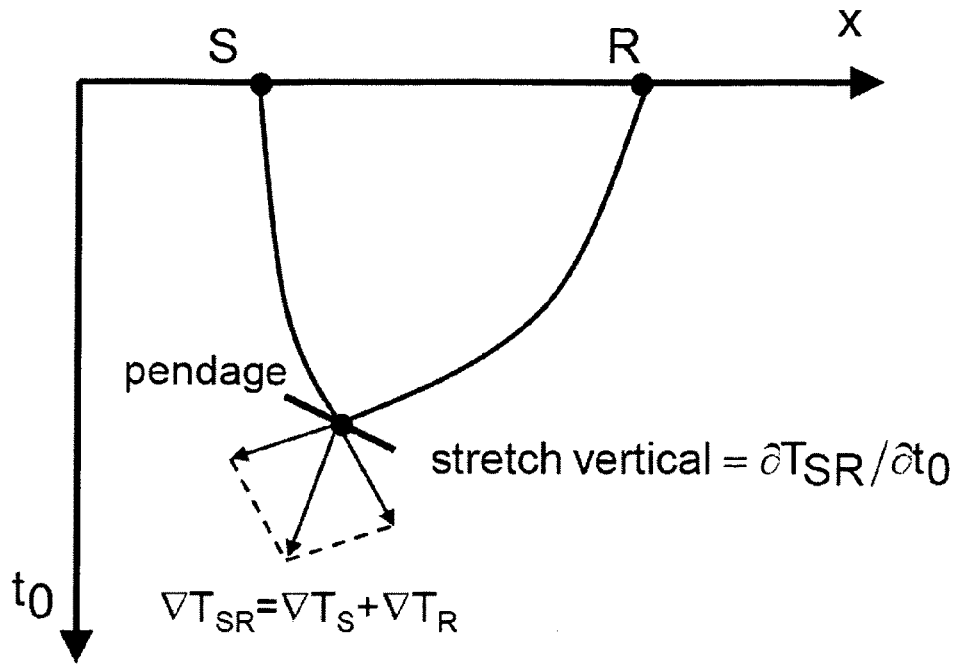

The time migration stretch factor is obtained by considering the "vertical" component of the double time migration gradient (FIG. 10).

$$\text{stretch vertical} = \frac{\partial T_{SR}}{\partial t_0}$$

where $T_{SR}$ is the double time of the time migration operator, $t_0$ is the time of the time-migrated image. This factor is directly derived from $T_{SR}$, time of the invariant, which may itself be used to compensate for the stretch of the time-migrated trace.

Figure 11:
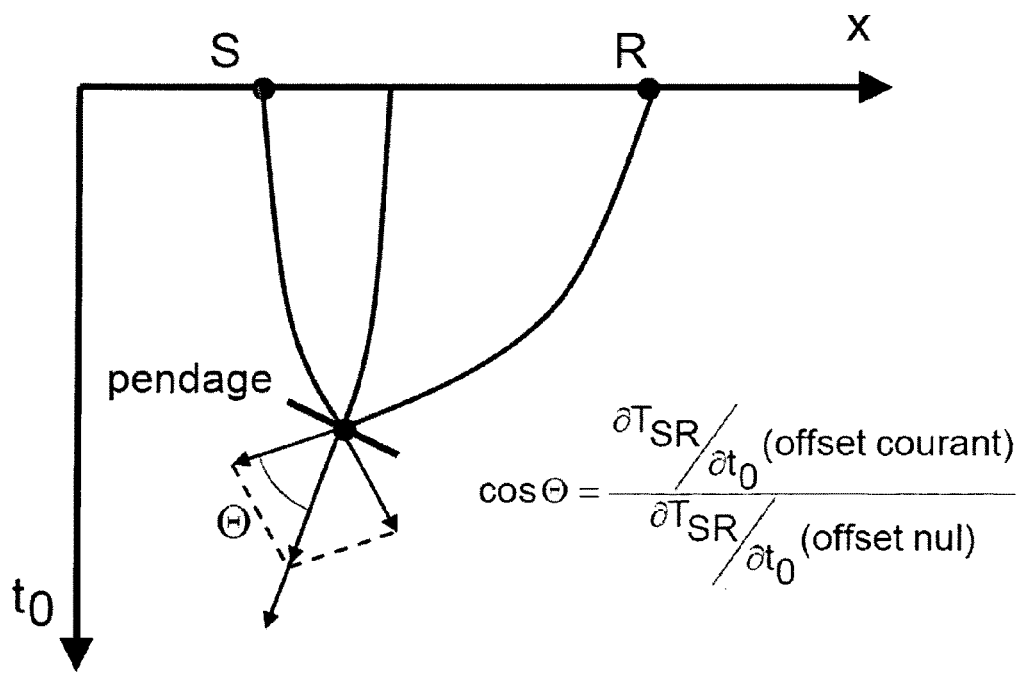

The calculation of the specular reflection angle $\Theta$ associated with the offset-ordered common image point collections is obtained by considering the local dip of the event (assumed to be an offset invariant), and by comparing the values of the "vertical" component of the gradient of the double time of time-migration at various offsets (FIG. 11). Indeed, the ratio of this component of the gradient at a given offset with that with a zero offset gives the cosine of the specular reflection angle. It should be noted that the calculation can also be performed for CIP gathers arranged in shot position or in source or receiver position.

$$\cos\Theta = \frac{\frac{\partial T_{SR}}{\partial t_0} \text{ current offset}}{\frac{\partial T_{SR}}{\partial t_0} \text{ zero offset}}$$

where $T_{SR}$ is the double time of the time-migration operator, $t_0$ is the time of the time-migrated image.

Figure 12:
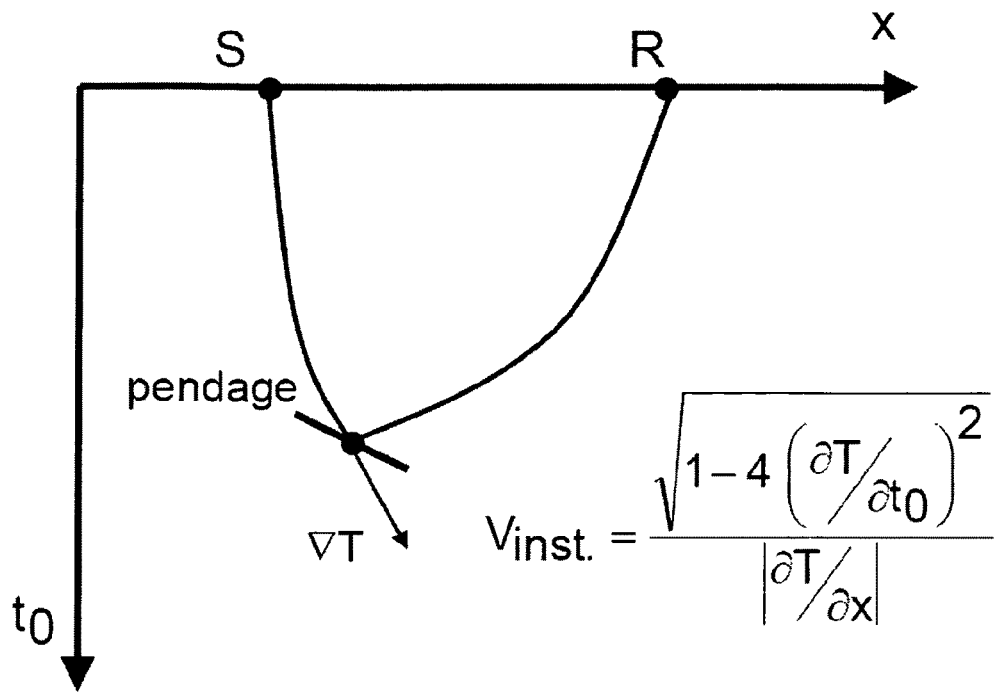

The calculation of an instantaneous velocity $V_{inst}$ on the basis of horizontal and vertical components of the gradient of the single time of time-migration is obtained by expressing this vector using the angle of incidence of the wave and the instantaneous velocity (FIG. 12). The calculation can be performed for all of the source and receiver geometries, which makes it possible to access anisotropic parameters using the information on the phase angle and the dip estimated below.

$$V_{inst.} = \frac{\sqrt{1 - 4\left(\frac{\partial T}{\partial t_0}\right)^2}}{\left|\frac{\partial T}{\partial x}\right|}$$

where T is the single time of the time-migration operator (for the source or receiver path),
x is the horizontal position in the image,
$t_0$ is the time of the time-migrated image.

Figure 13:
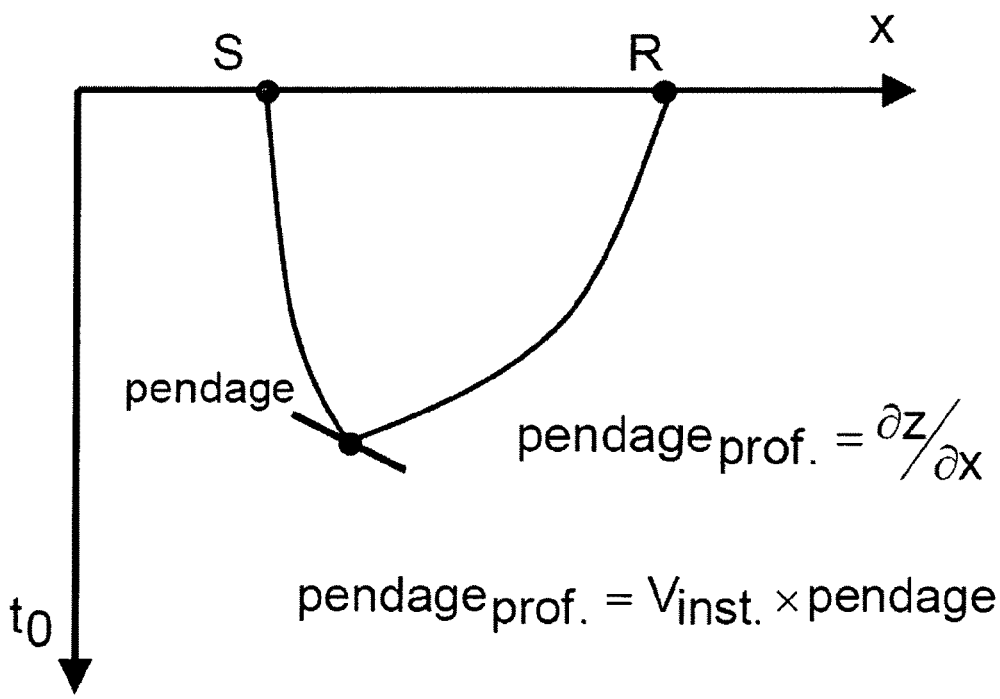

The calculation of the depth dip of the event considered is obtained by considering the picked time dip and the estimation of the instantaneous velocity estimated above (FIG. 13).

$$dip_{depth} = \frac{\partial z}{\partial x}$$

$$dip_{depth} = V_{inst.} \times \text{dip}$$

where z is the depth of the event observed in the depth-migrated,
x is the horizontal position in the image.

The calculation of phase angles makes it possible to free from the assumption of isotropy used for the calculation of reflection angles. It relies on the use of instantaneous velocity which enables slowness vectors $p_S$ and $p_R$ to be calculated at the image point.

$$p_S = \begin{pmatrix} \frac{\partial T_S}{\partial x} \\ \frac{2}{V_{inst.S}} \frac{\partial T_S}{\partial t_0} \end{pmatrix} \text{ et}$$

$$p_R = \begin{pmatrix} \frac{\partial T_R}{\partial x} \\ \frac{2}{V_{inst.R}} \frac{\partial T_R}{\partial t_0} \end{pmatrix}$$

where $T_S$ and $T_R$ denote the simple times of the migration operator (for the source and the receiver, respectively). The directions of these vectors are characterised by phase angles. From these vectors, it is also possible to derive the cosine of the phase angle of reflection by equations $$\cos\Theta_{S\ phase} = \frac{p_s \cdot (p_s + p_r)}{|p_s||p_s + p_r|} \text{ and}$$

$$\cos\Theta_{R\ phase} = \frac{p_R \cdot (p_s + p_r)}{|p_R||p_s + p_r|}$$

where $\|$ denotes the norm • and denotes the scalr product.

The estimation of CRS attributes is obtained by adjustment on the distribution of kinematic invariants obtained by time-demigration of local curve events. These CRS attributes can be used to estimate a depth-velocity model (Duveneck 2004), or for various other applications of the CRS attributes (Jäger et al., 2001).

We should note that while FIGS. 8 to 13 diagrammatically show a two-dimensional case, the process can be generalised directly to a three-dimensional case.

Figure 8:
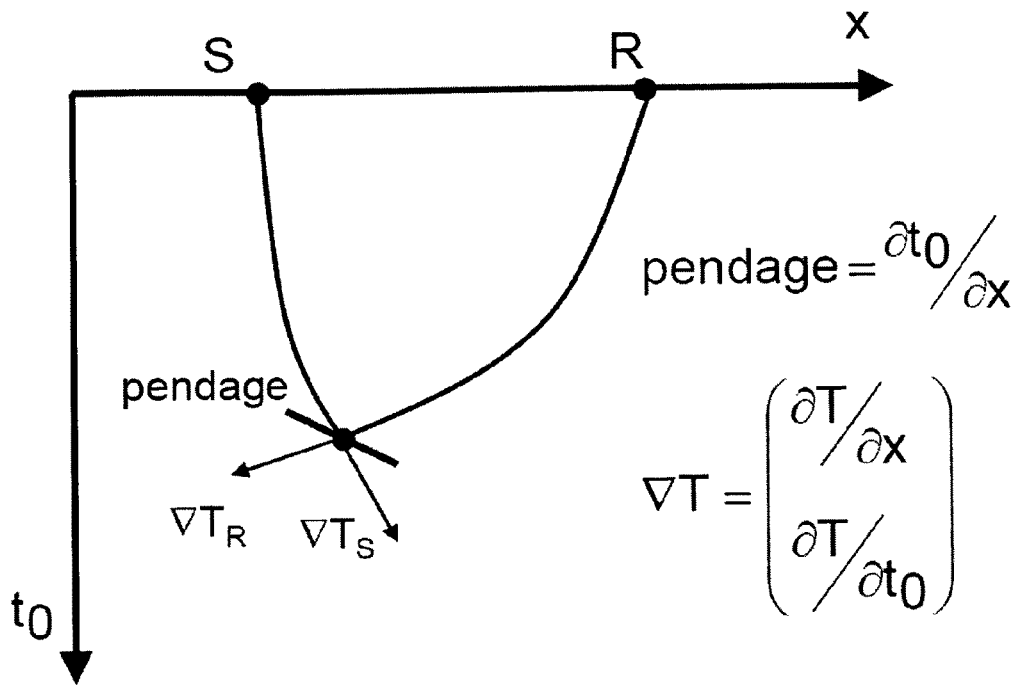

FIG. 8 diagrammatically shows various elements involved in the kinematic migration and demigration steps. These elements include in particular the dip of the time-migrated image, and the gradients of the source, $T_S$, and receiver $T_R$ travel times, at the basis of the estimation of various attributes. These travel times are dependent on the position in the migrated image $(x, t_0)$, the source S or receiver R position, and finally the velocity model. These elements are used in the time migration, where their sum is involved, $T_{SR}=T_S+T_R$.

Figure 9:
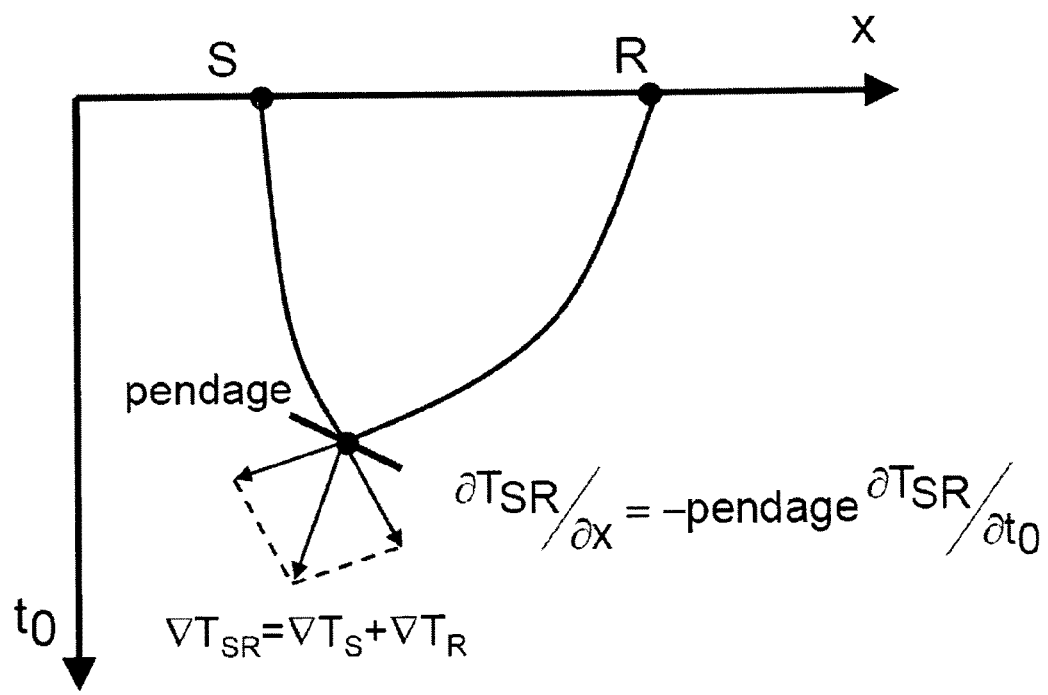
FIG. 9 shows a condition for focusing of the kinematic time migration, FIG. 10 diagrammatically shows a vertical stretch determination, FIG. 11 diagrammatically shows a step of determining the cosine of a reflection angle, FIG. 12 diagrammatically shows an instantaneous velocity determination step, FIG. 13 diagrammatically shows step of determining the depth dip on the basis of the time dip and the instantaneous velocity.

FIG. 9 diagrammatically shows a focusing condition of the kinematic time migration. For a given dip, the position of the migrated point $(x, t_0)$ and those of the source and the receiver will satisfy this condition.

FIG. 10 diagrammatically shows a step of determining the vertical stretch.

FIG. 11 diagrammatically shows a step of determining the cosine of the reflection angle. The ratio between the vertical stretch values with a given offset and that with a zero offset is determined. This estimation assumes an isotropic medium.

FIG. 12 diagrammatically shows a step of determining the instantaneous velocity. The components of the single, source or receiver transit time gradients are used. The velocity can therefore be obtained for the source and receiver trajectories.

FIG. 13 diagrammatically shows a step of determining the depth dip on the basis of the time dip and the instantaneous velocity.

Figure 14:
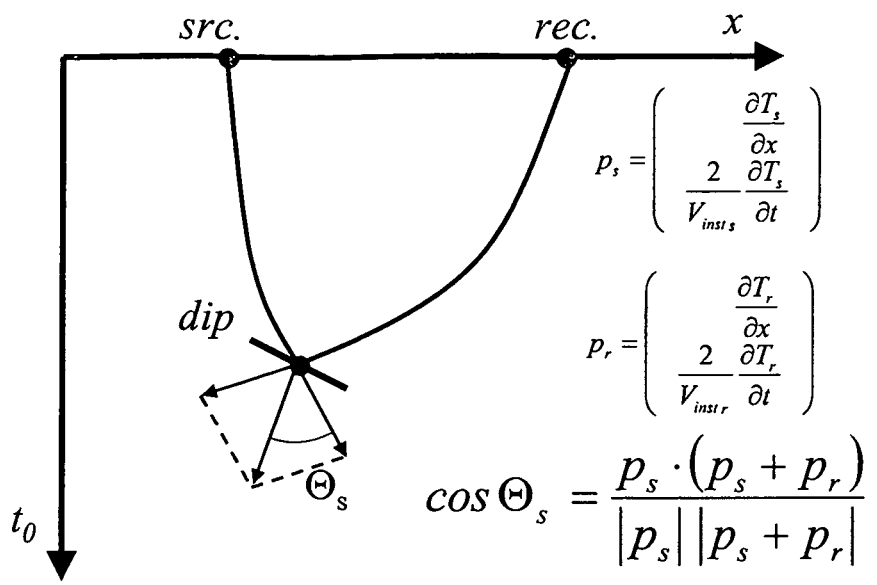
FIG. 14 diagrammatically shows a step of determining phase angles.

FIG. 14 diagrammatically shows a step of determining phase angles. Slowness vectors are calculated from instantaneous velocities and are used to derive phase angles, in particular reflection phase angles.

Use of the Attributes to Estimate a Velocity Model

The second phase 200 of the processing process shown in FIG. 4 is applied to the kinematic invariants.

On the basis of these kinematic invariants, a processing operation is implemented, making it possible to estimate a time-velocity or a depth-velocity model according to which the following steps are iterated.

According to first step 201, a kinematic migration (time or depth) of the kinematic invariants obtained above using a model of the velocity field (time or depth) of the subsurface.

According to a second step 202, an alignment of the migrated points obtained is characterised.

Document FR 2 821 677 describes such alignment measurements.

It is also possible to apply a criterion for minimising the slope of the migrated events in the CIP gathers (Chauris et al., 2001a).

According to a third step 203, the parameters of the velocity model (time or depth) are updated.

Step 203 consists of selecting a time- or depth-velocity field setting of parameters that optimises the alignment of the migrated facets.

Steps 201, 202 and 203 can be repeated until an alignment deemed to be sufficient is obtained.

It should be noted that the processing operation for selecting the parameter values of the velocity field as proposed does not systematically require a time or depth migration of the seismic data (which is very costly) after each updating of the velocity model.

It is consequently understood that the process proposed by the invention can be implemented without requiring high computing powers.

Figure 6:
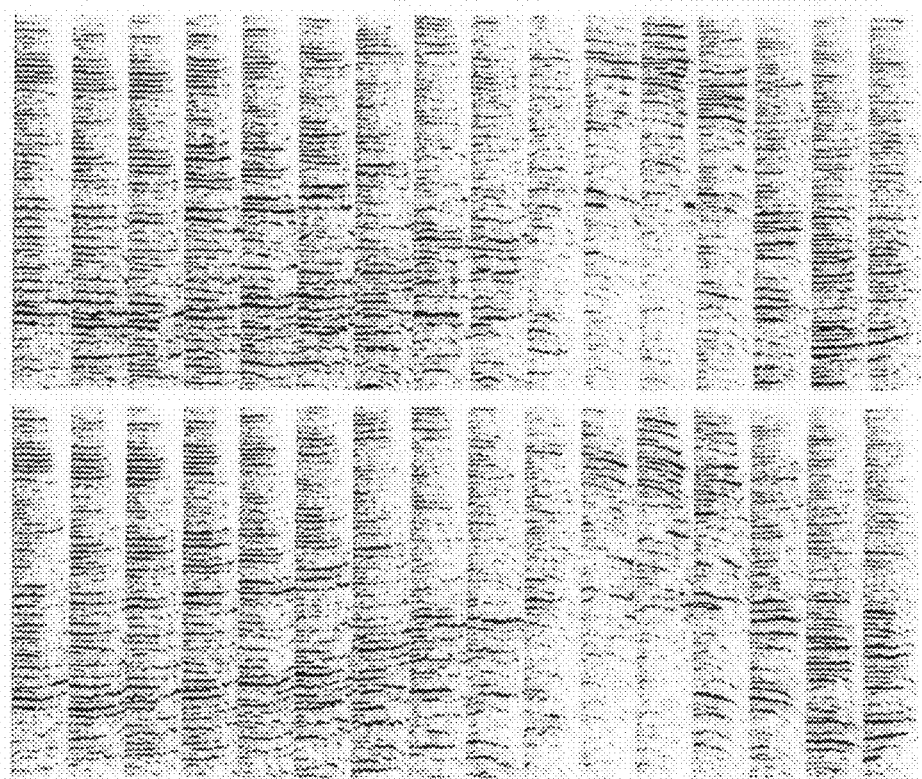
FIG. 6 shows common image point (CIP) gathers of traces.

FIG. 6 diagrammatically shows an example of pre-stack depth-migrated CIP gathers (PreSDM) obtained by respectively applying the final velocity model obtained using a picking in the pre-stack time-migrated data (above) and the final velocity model obtained by using a picking in the pre-stack depth-migrated data (below).

Figure 7:
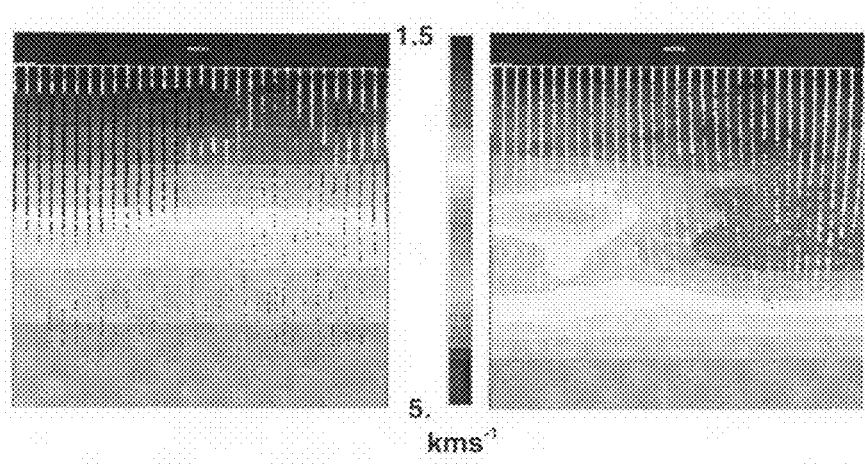
FIG. 7 shows an example of an initial depth-velocity model (at the left) and a final depth-velocity model (at the right) obtained after applying the processing process according to the invention, FIG. 8 diagrammatically shows various elements involved in the kinematic migration-demigration.

FIG. 7 diagrammatically shows an initial depth-velocity model (at left) and a final depth-velocity model (at right) obtained in the second phase of the process.

REFERENCES

Chauris, H., Noble, M. S., Lambaré, G., and Podvin, P., 2001. Migration velocity analysis from locally coherent events in 2-D laterally heterogeneous media, Part I: Theoretical aspects, Geophysics, Vol. 67, No. 4, pages 1202-1212.

Chauris, H., Noble, M. S., Lambaré, G., and Podvin, P., 2001. Migration velocity analysis from locally coherent events in 2-D laterally heterogeneous media, Part II: Applications on synthetic and real data, Geophysics, Vol. 67, No. 4, pages 1213-1224.

Dix, C. H., 1955. Seismic velocities from surface measurements, Geophysics 20, 68.

Duquet, B., Lailly, P., and Ehinger, A., 2001. 3D Plane wave migration of streamer data, SEG Expanded Abstracts 20, 1033.

Duveneck, E., 2004. Velocity model estimation with data-derived wavefront attributes, Geophysics, Vol. 69, NO. 1, pages 265-274.

Fagin, S., 1999. Model-based Depth Imaging, Society of Exploration Geophysicists, Tulsa, USA.

Guillaume, P., Audebert, F., Chazanoel, N., Dirks, V., and Zhang, X., 2004, Flexible 3D finite-offset tomography velocity model building, EAGE 2004, Ext. Abstracts.

Guillaume, P., Audebert, F., Berthet, P., David, B., Herrenschmidt, A., and Zhang, X., 2001. 3D Finite-offset tomographic inversion of CRP-scan data, with or without anisotropy, $71^{st}$ annual SEG meeting, Exp. Abstracts, INV2.2.

Jäger, R., Mann, J., Höcht, G. and Hubral P., 2001. Common-reflection-surface stack: Image and attributes, Geophysics, Vol. 66, pages 97-106.

Jiao, J., Stoffa, P. L., Sen M. K., Seifoullaev, R. K., 2002, Residual migration-velocity analysis in the plane-wave domain, Geophysics, Vol. 67, No. 4, pages 1258-1269.

Müller, T., 1999. The Common Reflection Surface Stack Method—Seismic imaging without explicit knowledge of the velocity model. Der Andere Verlag, Bad Iburg.

Press, W. H., Flannery, B. P., Teukoslsky, S. A., Veltering, W. T., 1986. Numerical recipes: the art of scientific computing, Cambridge university Press.

Schultz, P., 1982. A method for direct estimation of interval velocity, Geophysics, Vol. 47, NO. 12, pages 1657-1671.

Siliqi, R., and Bousquié, N., 2001. Time to move to anelliptic time processing, $71^{st}$ annual SEG meeting, Exp. Abstracts.

Yilmaz, O., 1987. Seismic data processing, Society of Exploration Geophysicists.

The invention claimed is:

1. A method of seismic data processing, wherein the data includes at least one set of seismic traces, with each trace including a signal recorded by a sensor after having been propagated in a subsurface area, with the signal being defined by an amplitude as a function of time, including the steps of:
    migration of at least one set of seismic traces according to an initial time-velocity model;
    picking in the time-migrated data one or more event(s) corresponding to one or more subsurface reflector(s) so as to obtain facets locally approximating the respective event;

performing kinematic demigration of the picked time-migrated facets so as to obtain processed seismic data comprising a set of facets and a set of attributes associated with the facets, wherein at least one set of attributes is used to produce one or more images representing the characteristics of said subsurface area.

2. Method according to claim 1, wherein the kinematic demigration step is performed according to the same initial time-velocity model as the time migration step.

3. Method according to claim 1, wherein the attributes associated with the facets include invariant attributes, wherein said invariant attributes are independent of the time-velocity model.

4. Method according to claim 3, wherein the invariant attributes include, for each migrated facet, a time of a reflected event, source and receiver positions, and local slopes of the event reflected event in the set of traces.

5. Method according to claim 3, further including an iteration of the steps of:

migration of the facets and invariant attributes according to a time or depth velocity model, characterization of an alignment of the migrated facets, and updating of the time or depth velocity model so as to optimize the alignment of the migrated facets.

6. Method according to claim 5, wherein the updating of the velocity model includes updating of the velocity field according to a criterion of minimization on at least one of the local slopes of the migrated facets in the CIP (Common Image Point) gathers.

7. Method according to claim 1, wherein the attributes associated with the facets include a specular reflection angle, phase angles, an instantaneous velocity, a vertical stretch factor, a depth dip or CRS attributes.

8. Method according to claim 1, in which the step of picking is applied on a pre-stack time-migrated seismic data.

9. Method according to claim 3, wherein said invariant attributes are used in a seismic data tomographic inversion process.

* * * * *

UNITED STATES PATENT AND TRADEMARK OFFICE
CERTIFICATE OF CORRECTION

PATENT NO. : 8,743,656 B2  
APPLICATION NO. : 12/156401  
DATED : June 3, 2014  
INVENTOR(S) : Herrmann et al.

Page 1 of 1

It is certified that error appears in the above-identified patent and that said Letters Patent is hereby corrected as shown below:

On the title page item (73), under "Assignee", in Column 1, Line 1, delete "CGG Veritas" and insert -- CGGVeritas --, therefor.

In the specification

Column 5, Line 62, delete "to is" and insert -- $t_o$ is --, therefor.

Column 6, Line 61, delete "scalr product." and insert -- scalar product. --, therefor.

In the claims

Column 9, Line 18, Claim 4, delete "the event" and insert -- the --, therefor.

Signed and Sealed this  
Twenty-sixth Day of January, 2016

Michelle K. Lee  
*Director of the United States Patent and Trademark Office*